United States Patent [19]

Yang et al.

[11] Patent Number: 5,754,888
[45] Date of Patent: May 19, 1998

[54] SYSTEM FOR DESTAGING DATA DURING IDLE TIME BY TRANSFERRING TO DESTAGE BUFFER, MARKING SEGMENT BLANK, REODERING DATA IN BUFFER, AND TRANSFERRING TO BEGINNING OF SEGMENT

[75] Inventors: Qing Yang, Wakefield; Yiming Hu, Kingston, both of R.I.

[73] Assignee: The Board of Governors for Higher Education, State of Rhode Island and Providence Plantations, Providence, R.I.

[21] Appl. No.: 588,132

[22] Filed: Jan. 18, 1996

[51] Int. Cl.⁶ .................................................. G06F 13/00
[52] U.S. Cl. .................................................. 395/872; 395/894
[58] Field of Search ........................... 364/248.1, 238.1, 364/236.2; 395/182.04, 441, 440, 834, 849

[56] References Cited

U.S. PATENT DOCUMENTS

| | | | |
|---|---|---|---|
| 4,507,751 | 3/1985 | Gawlick et al. | 395/618 |
| 4,916,605 | 4/1990 | Beardsley et al. | 395/489 |
| 5,297,258 | 3/1994 | Hale et al. | 395/275 |
| 5,325,509 | 6/1994 | Lautzenheiser | 395/425 |
| 5,353,410 | 10/1994 | Macon, Jr. et al. | 395/275 |
| 5,420,998 | 5/1995 | Horning | 395/425 |
| 5,542,066 | 7/1996 | Mattson et al. | 395/463 |

*Primary Examiner*—Thomas C. Lee
*Assistant Examiner*—Anderson I. Chen
*Attorney, Agent, or Firm*—Samuels, Gauthier, Stevens & Reppert

[57] ABSTRACT

A disk storage architecture called DCD, Disk Caching Disk, for optimizing I/O performance. The DCD uses a small log disk, referred to as cache-disk, in the range of tens of MB as a secondary disk cache to optimize write performance. While the cache-disk and the normal data disk have the same physical properties, the access speed of the former differs dramatically from the latter because of different data units and different ways in which data are accessed. The objective is to exploit this speed difference by using the log disk as a cache to build a reliable and smooth disk hierarchy.

8 Claims, 12 Drawing Sheets

SYSTEM FOR DESTAGING DATA DURING IDLE TIME BY TRANSFERRING TO DESTAGE BUFFER, MARKING SEGMENT BLANK, REODERING DATA IN BUFFER, AND TRANSFERRING TO BEGINNING OF SEGMENT

The research for this disclosure is supported in part by The National Science Foundation under Grant No. MIP-9505601.

FIELD OF THE INVENTION

This invention relates to a disk storage architecture called DCD, Disk Caching Disk, for the purpose of optimizing I/O performance.

BACKGROUND OF THE INVENTION

Current disk systems generally use caches to speed up disk accesses. Such disk caches reduce more effectively read traffic than write traffic. As the RAM size increases rapidly and more read requests are absorbed, the proportion of write traffic seen by disk systems will dominate disk traffic and could potentially become a system bottleneck. In addition, small write performance dominates the performance of many current file systems such as on-line transaction processing and office/engineering environment. Therefore, write performance is essential to the overall I/O performance.

The invention embodies a disk subsystem architecture that improves average, response time for writes by one to two orders of magnitude in an office and engineering workload environment without changing the existing operating systems.

There has been extensive research reported in the literature in improving disk system performance. Previous studies on disk systems can generally be classified into two categories: improving the disk subsystem architecture and improving the file system that controls and manages disks.

Because of the mechanical nature of magnetic disks, the performance of disks has increased only gradually in the past. One of the most important architectural advances in disks is RAID (Redundant Array of Inexpensive Disks) architecture pioneered by a group of researchers in UC Berkeley, Katz, R. H.; Gibson, A; and Patterson, D. A, *Disk System Architectures for High Performance Computing*, Proceeding of the IEEE, pp. 1842–1858, 1989. The main idea of RAID is using multiple disks in parallel to increase the total I/O bandwidth which scales with the number of disks. Multiple disks in a RAID can service a single logical I/O request or support multiple independent I/Os in parallel. Since the size and the cost of disks drop rapidly, RAID is a cost effective approach to high I/O performance. One critical limitation of RAID architecture is that their throughput is penalized by a factor of four over nonredundant arrays for small writes which are substantial and are becoming a dominant portion of I/O workload. The penalty results from parity calculations for a new data, which involves readings of old data and parity, and writings of new data and parity. A solution was proposed to the small-write problem by means of parity logging. Stodolsky, D.; Holland, M.; Courtright II, W. V.; and Gibson, G. A., *Parity Logging Disk Arrays*, ACM Transaction of Computer Systems, pp. 206–235, 1994. It was shown that with minimum overhead, parity logging eliminates performance penalty caused by RAID architectures for small writes.

The RAID architectures are primarily aimed for high throughput by means of parallelism rather than reducing access latency. Except for low average throughput workload such as an office/engineering environment, performance enhancement due to RAID is very limited. Caching is the main mechanism for reducing response times. Since all write operations must eventually be reflected on a disk, a volatile cache may post reliability problems. Nonvolatile RAM can be used to improve disk performance, particularly write performance. Baker, M.; Asami, S.; Deprit, E.; Ousterhout, J.; and Seltzer, M., *Non-Volatile Memory for Fast, Reliable File Systems*, Proceedings of the 5th International Conference on Architectural Support for Programming Languages and Operation System (ASPLOS), Boston, Mass., pp. 10–22. ACM Press, New York, N.Y. USA, October 1992, Published as Computer Architecture News, 20, Special Issue. However, because of the high cost of non-volatile RAMs, the write buffer size is usually very small (less than 1 MB) compared to disk capacity. Such small buffers get filled up very quickly and can hardly catch the locality of large I/O data. Increasing the size of non-volatile cache is cost-prohibitive making it infeasible for large I/O systems.

Since the attempts in improving the disk subsystem architecture have so far met with limited success for write performance, extensive research has been reported in improving the file systems. The most important work in file systems is Log-structured File System (LFS). The central idea of an LFS is to improve write performance by buffering a sequence of file changes in a cache and then writing all the modifications to disk sequentially in one disk operation. As a result, many small and random writes of the traditional file system are converted into a large sequential transfer in a log structured file system. In this way, the random seek times and rotation times associated with small write operations are eliminated thereby improving disk performance significantly. While LFS apparently has a great potential for improving the write performance of traditional file systems, it has not been commercially successful since it was introduced more than eight years ago. Applications of LFS are mainly limited to academic research such as Sprite LFS, BSD-LFS and Sawmill. This is because LFS requires a significant change in operating systems, needs a high cost cleaning algorithm, and is much more sensitive to disk capacity utilization than that of traditional file systems. The performance of LFS degrades rapidly when the disk becomes full and gets worse than the current file system when the disk utilization approaches 80%. In addition, LFS needs to buffer a large amount of data for a relatively long period of time in order to write into disk later as a log, which may cause reliability problems.

Logical Disk approach improves the I/O performance by working at the interface between the file system and the disk subsystem. It separates file management and disk management by using logical block numbers and block lists. Logical Disk hides the details of disk block organization from file system, and can be configured to implement LFS with only minor changes in operating system code. However, the Logical Disk approach requires a large amount of memory, about 1.5 MB for each GB of disk, to keep block mapping tables. Moreover, all the mapping informations are stored in the main memory giving rise to reliability problems.

Therefore, based on the prior art techniques, caching is the main mechanism for reducing access latency, but caching has not been as effective as expected because of large data sizes and small cache sizes. For write accesses, caching is even more expensive due to the high cost of non-volatile RAMs. It is also clear that a log structured file system can reduce access time significantly. It is known that the data transfer rate in a unit of a track is almost eight times faster than in a unit of a block. Even faster data transfer rate can be achieved if transfer unit is larger.

Baker et al. studied the application of Non-Volatile RAM (NVRAM) as a disk cache in distributed client/server systems, Baker, M.; Asami, S.; Deprit, E.; Ousterhout, J.; and Seltzer, M., *Non-Volatile Memory for Fast, Reliable File Systems*, in Proceedings of the 5th International Conference on Architectural Support for Programming Languages and Operating System (ASPLOS), Boston, Mass., pp. 10–22, ACM Press, New York, N.Y., USA, October 1992. Published as computer Architecture News, 20 (Special Issue). They found that one-megabyte of NVRAM at each client can reduce write traffic to server by 40–50% and one-half megabyte NVRAM write buffer for each file system on the server side reduces disk accesses by about 20% to 90%. It was reported in their simulation results of applying NVRAM as a write cache to disks, Ruemmler, C and Wilkes, J., *An Introduction to Disk Drive Modeling*, IEEE Computer, pp. 17–28, March 1994. They found that placing 128 to 4096 KB of NVRAM as write cache can reduce the I/O response time by a factor of 2 to 3, since overwrites account for a major portion of all writes (25% by hplajw, 47% for snake and about 35% for cello).

Another advantage of using large RAM to buffer disk write requests is that the requests can be reordered in the buffer. Such reordering makes it possible to schedule disk writes according to seek distance or access time so that the average head positioning time can be reduced substantially. Extensive studies have been conducted and many good algorithms such as SCAN, Shortest Access Time First (SATF) and Weighted Shorted Time First have been proposed, Jacobson, D. M. and Wilkes, J., *Disk Scheduling Algorithms Based on Rotational Position*, Tech. Rep. HPL-CSP-91-7rev1., Hewlett-Packard Laboratories, March 1991; and Seltzer, M.; Chen, P.; and Ousterhout, J., *Disk Scheduling Revisited* in Proceedings of the 1990 Winter USENIX, (Washington, D.C.), pp. 313–324, Jan. 22–26, 1990. In the DCD case, the data are first written into cache-disk in log format, which eliminates most seeks and rotation latencies. The disk arm scheduling is not needed. However, it can be applied to the destage algorithm to reduce the cost of destage. This is especially important for relatively high and uniform time sharing workload such as cello and transaction processing work.

Several techniques have been reported in the literature in minimizing small write costs in RAID systems. Parity logging, an elegant mechanism proposed by utilizing the high transfer rate of large sequential data to minimize small write penalty in RAID systems, Stodolsky, D.; Holland, M.; Courtright II, W. V.; and Gibson, G. A., *Parity Logging Disk Arrays*, ACM Transaction of Computer Systems, pp. 206–235, August 1994. They have shown that with minimum overhead, parity logging eliminates performance penalty caused by RAID architectures for small writes. It was proposed a very interesting approach called write-twice to reduce the small write penalty of mirror disks, Solworth, J. A. and Orji, C. U., *Distorted Mirrors*, Proceedings at the First International Conference on Parallel and Distributed Information Systems, pp. 10–17, 1991. In their method several tracks in every disk cylinder are reserved. When a write request comes, it is immediately written to a closest empty location, and the controller acknowledges the write as complete. Later the data is written again to its fixed location. Up to 80% improvement in small performance was reported. It can also be used to reduce write response time in normal disks. The write-twice method is normally implemented in the disk controller level since it needs detailed timing information of disk drive. It also requires substantial amount of disk storage to reserve tracks in each cylinder. Except for a few high-end products, most disk drives now use 2 or 3 platters per drive, implying only 4 to 6 tracks per cylinder. Therefore, the write-twice approach is mainly for those applications where cost is not the primary concern.

The Episode file system which is part of the DECorum Distributed Computing Environment, uses log to improve crash recovery of meta-data, Shirriff, K. W., *Sawmill: A Logging File System for a High Performance RAID Disk Array*, PhD thesis, University of California at Berkeley, 1995; and Kazar, M. L.; Leverett, O. T. A. B. W.; Postolides, V. A.; Bottos, B. L.; Chutani, S.; Everhart, C. F.; Mason, W. A.; and Zayas, E. R., *Decorum File System Architectural Overview*, Proceedings of the 1990 USENIX Summer Conference, pp. 151–163, June 1990. The changes of meta-data in write buffer are collected into logs and are periodically (typically every 30 seconds) written into disk to ensure a reliable copy of changes. Cache logging eliminates many small writes caused by meta-data updates. The cache logging works in file system level while the DCD works in the device level. The cache logging works horizontally where the content of log disk is basically a mirror image of the large RAM buffer, whereas the log disk and RAM buffer in the DCD work vertically in the sense that the log disk acts as an extension of a small NVRAM buffer to achieve high performance with limited cost.

BRIEF SUMMARY OF THE INVENTION

Broadly the invention embodies a new disk organization referred to hereinafter in this disclosure as disk caching disk (DCD).

The disk architecture disclosed herein, DCD, improves write performance in the most-widely used office/engineering environment. The new architecture exploits the temporal locality of disk accesses and the dramatic difference in data transfer rate between a log disk system and a traditional disk system. The DCD architecture has three levels of hierarchy consisting of a RAM buffer, a cache-disk which stores data in log format, and a data disk that stores data as in traditional disks. The cache-disk can be implemented either using a separate physical drive or a logic disk that is a partition of data disk depending on performance/cost considerations. The disk cache including the RAM and cache-disk is transparent to CPU so that there is not need to change the operating system to incorporate this new disk architecture. Simulation experiments have been carried out by using traces representing three typical office/engineering workload environments. Numerical results have shown that the new DCD architecture is very promising in improving write performance. With Immediate Report, the DCD improves write performance by one to two orders of magnitude over the traditional disk systems. A factor of 2 to 4 performance improvement over traditional disks are observed for the DCD with report-after-complete. It is noted that the DCD also improved read performance in many cases. The additional cost introduced by the DCD is a small fraction of the disk system cost. The performance/cost evaluation shows that with an appropriate size non-volatile RAM we can obtain over X times better write performance than traditional disk system for the cost of X dollars.

The fundamental idea behind the DCD is to use a log disk as an extension of a RAM cache to cache file changes and to destage the data to the data disk afterward when the system is idle. The log disk is called a cache-disk while the normal data disk is called a data disk. Small and random writes are first buffered in a small RAM buffer. Whenever the cache-disk is idle, all data in the RAM buffer are written, in one data transfer, into the cache-disk which is located between the RAM buffer and the data disk. As a result, the RAM buffer is quickly made available for additional requests so that the two level cache appears to the host as a large RAM. When the data disk is idle, destage from the cache-disk to the normal data disk is performed. Since the cache is a disk with capacity much larger than a RAM, it can capture the temporal locality of I/O file transfers and it is also highly reliable. In addition, the log disk is only a cache which is transparent to the file system. There is no need to change the underlying operating system to apply the new disk architecture. Trace-driven simulation experiments have been carried out to quantitatively evaluate the performance of the new disk architecture. Numerical results show that DCD improves write performance over the traditional disk systems by two orders of magnitude for a fraction of the additional cost. Furthermore, less cost is possible if the DCD is implemented on an existing data disk with a fraction of the data disk space used as the cache-disk.

A few decades ago, computer architects proposed a concept of memory interleaving to improve memory throughput. Later, cache memories were introduced to speedup memory accesses for which interleaved memory systems were not able to do. The RAID systems are analogous to the interleaved memories while the DCD system is generally analogous to CPU caches. Existing disk caches that use either part of main memory or dedicated RAM, however, are several orders of magnitude smaller than disks because of the significant difference between RAMs and disks in terms of cost. Such "caches" can hardly capture the locality of I/O transfers and cannot reduce disk traffic as much as a CPU cache can for main memory traffic. Therefore, traditional disk "caches" are not as successful as caches for main memories, particularly for writes.

In a preferred embodiment, a DCD embodying the invention uses a disk that has a similar cost range as the data disk making it possible to have the disk cache large enough to catch the data locality in I/O transfers. However, it is not easy to make one disk physically much faster than the other so that the former can become a cache as done in main memory systems. The invention exploits the temporal locality of I/O transfers and uses the idea of log structured file systems to minimize the seek time and rotation time which are the major part of disk access time.

The DCD of the invention uses a small log disk, referred to as cache-disk, in the range of tens of MB as a secondary disk cache to optimize write performance. While the cache-disk and the normal data disk have the same physical properties, the access speed of the former differs dramatically from the latter because of different data units and different ways in which data are accessed. The invention exploits this speed difference by using the log disk as a cache-disk to build a reliable and smooth disk hierarchy.

A small RAM or NVRAM buffer in the range of hundreds KB to 1 MB is used to collect small write requests to form a log which is transferred onto the cache-disk whenever the cache-disk is idle. Because of temporal locality that exists in office/engineering work-load environments, the DCD system shows write performance close to the same size RAM (i.e. solid-state disk) for the cost of a disk. Moreover, the cache-disk can also be implemented as a logical disk in which case a small portion of the normal data disk is used as a log disk.

Trace-driven simulation experiments have been carried out to evaluate the performance of the DCD. Under the office/engineering workload environment, the DCD shows superb disk performance for writes as compared to existing disk systems. Performance improvements of up to two orders of magnitude are observed in terms of average response time for write operations. Furthermore, the DCD is very reliable and works in device or device driver level. As a result, it can be applied directly to current file systems without the need of changing the operating system.

DESCRIPTION OF THE PREFERRED EMBODIMENT(S)

Architecture

Figure 1:
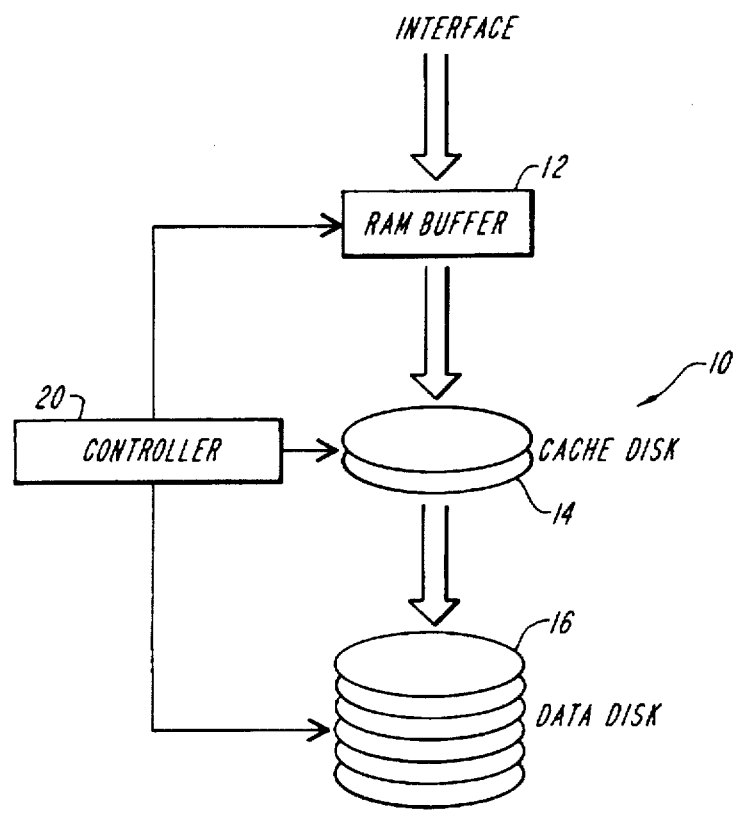
FIG. 1 is an illustration of the invention comprising two physical disks.

The structure of a DCD 10 embodying the invention is shown in FIG. 1. It consists of three levels of hierarchy. At the top of the hierarchy is a RAM buffer 12 (first level cache) with a size ranging from hundreds of kilobytes to 1 megabyte. A second level cache 14 is a log or access disk drive with a capacity in the range of a few MB to tens of MB, called a cache-disk 14.

Figure 2:
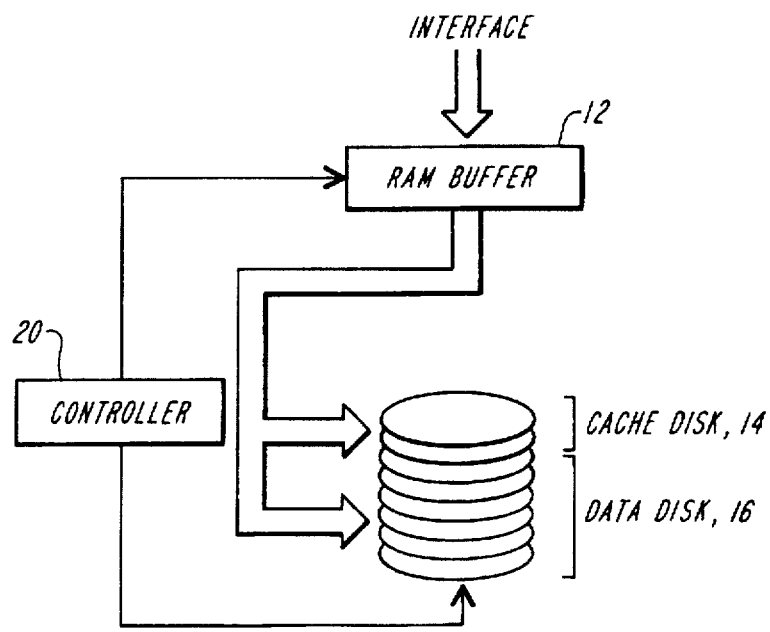
FIG. 2 is an illustration of the invention comprising two logical disks.

The cache-disk 14 can be a separate physical disk drive to achieve high performance as shown in FIG. 1. Alternatively, referring to FIG. 2, one logical disk partitioned 20 functionally residing on one disk drive or on a group of disk drives for cost effectiveness. Referring again to FIG. 1, at the bottom level, a data disk 18 is a normal data disk drive in which files reside. The data organization on this data disk drive 18 is a traditional, unmodified, read-optimized file system such as the UNIX Fast File System or Extended File System. A controller (CPU) 20 communicates with the buffer 12, cache disk 14 and data disk 16.

Operation

The following discussion is based on the structure of FIG. 1 unless otherwise noted.

Writing

Referring to FIG. 1, upon a disk write, the controller 20 first checks the size of the request. If the request is a large write, say over 64 KB or more, it is sent directly to the data disk 16. Otherwise, the controller 20 sends the request to the RAM buffer 12 that buffers small writes from a host and forms a log of data to be written into the cache-disk 14. As soon as the data are transferred to the RAM buffer 12, the controller 20 sends an acknowledgement of writing complete to the host, referred to as immediate report. (The case for report after disk transfer is complete will be discussed shortly.) The data copy in the RAM buffer 12 is then sent to the cache-disk 14 to ensure that a reliable copy resides in the cache-disk if the cache-disk is not busy with writing a previous log or reading. Because the disk head of the data disk 16 is usually positioned on an empty track that is available to write a log, called Current Log Position (CLP), seeking is seldom necessary except for the situation where the log transfer occurs when the data disk 16 is being read or destaging. The write can start immediately after the rotation latency. While the writing is in progress on the cache-disk, the controller continues to collect the incoming write requests, putting them into the RAM buffer, combining them to form a large log, and committing them as finished immediately after the data transfer is finished. When the cache-disk finishes writing, the new large log is written immediately into the cache-disk again, and another round of collecting small write requests to large log starts.

One important feature here is that data do not wait in the buffer until the buffer is full. Rather, they are written into the cache-disk whenever the cache-disk is available. In other words, the DCD never lets the cache-disk become idle as long as there are write requests coming or in the queue. This feature has two important advantages. First, data are guaranteed to be written into the cache-disk when the current disk access finishes. Thus, data are stored in a safe storage within tens of milliseconds on average, resulting in much better reliability than other methods that keep data in the RAM buffer for a long time. Even in the worst case, the maximum time that data must stay in the RAM is the time needed for writing one full log, which takes less than a few hundreds of milliseconds depending on the RAM size and the speed of disk. This situation occurs when a write request arrives just when the cache-disk starts writing a log. Second, since data are always quickly moved from RAM buffer to the cache-disk, the RAM buffer can have more available room to buffer large burst of requests which happens very frequently in an office/engineering workload.

Although seek times are eliminated for most write operations on the cache-disk, at the beginning of each log write there is on average a half-revolution rotation latency. Such rotation latency will not cause a severe performance problem because of the following reasons. In the case of low write traffic, the log to be written on the cache-disk is usually small making the rotation time a relatively large proportion. However, such a large proportion does not pose any problem because the disk is in idle state most of time because of the low write traffic. In the case of high write traffic, the controller is able to collect a large amount of data to form a large log. As a result, the rotation latency becomes a small percentage of the log to be written and is negligible. Therefore, the DCD can dynamically adapt to the rapid change of write traffic and perform very smoothly.

Figure 3:
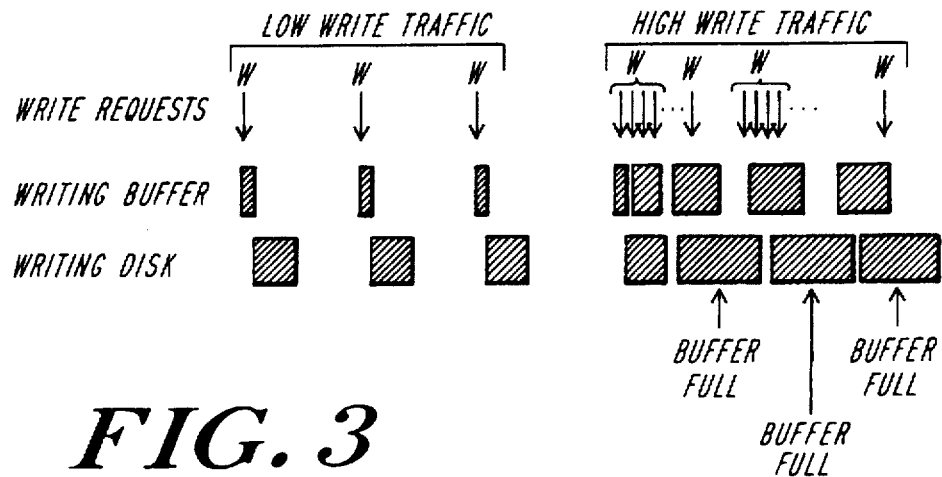
FIG. 3 is an illustration of a timing relationship between log collecting and writing.

FIG. 3 shows the timing relationship between log collecting and log writing. From this figure, one can see that the total throughput of the DCD will not be affected by the above delay. At low load, the cache-disk has enough time to write logs as shown in the left hand part of the figure. At high load, on the other hand, the cache-disk continuously writes logs that fill the RAM buffer as shown in the right hand part of the figure.

Reading

Read operations for the DCD are straightforward. When a read access arrives, the controller first searches the RAM buffer and the cache-disk. If the Data is still in the RAM buffer then the data is immediately ready. If the data is in the cache-disk, then a seek operation to the data track is needed. If the data has already been destaged to the data disk, the read request is sent to the data disk. It was found in simulation experiments that more than 99% of read requests are sent to the data disk. Reading from buffer or cache-disk seldom occurs. This is because most file systems use a large read cache so that most read requests for the newly written data are captured by the cache while old data are most likely to have a chance to be destaged from the cache-disk to the data disk. The read performance of the DCD is therefore similar to and some times better than that of traditional disk because of reduced traffic at the data disk as evidenced later in this disclosure.

Destaging

The basic idea of the DCD is using the combination of the RAM buffer and the cache-disk as a cache to capture both spatial locality and temporary locality. In other words, the RAM buffer and the cache-disk are used to quickly absorb a large amount of write quests when system is busy. Data are moved from the cache-disk to the data disk when the system is idle or less busy. Since the destage process competes with disk accesses, an algorithm to perform data destaging is important to the overall system performance.

Figure 4:
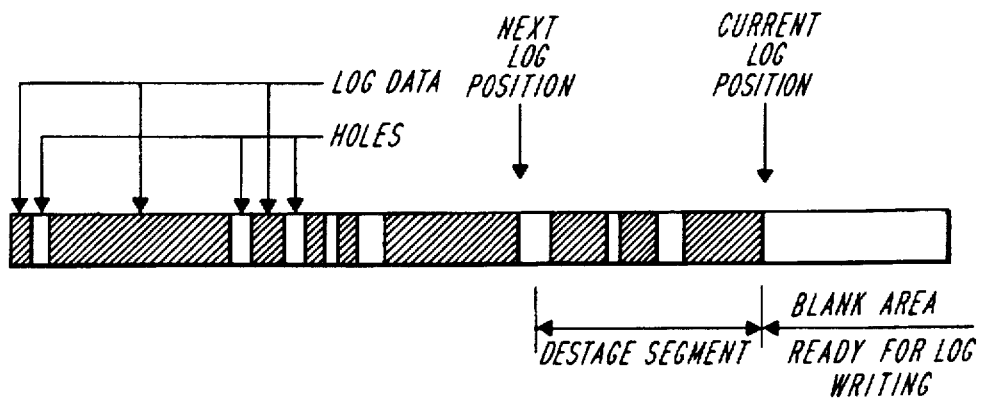
FIG. 4 is an illustration of a destage algorithm.

Since a disk is used as the disk cache, there is a sufficiently large and safe space to temporarily hold newly written data. In addition, it was observed from traces under the office/engineering environment that write requests show a bursty pattern as will be discussed shortly. There is usually a long period of idle time between two subsequent bursts of requests. Therefore, destage is performed only at the idle time so that it will not interfere with the incoming disk accesses. There are several techniques to detect idle time in a disk system. In the experiments, a simple time interval detector was used. If there is no incoming disk access for a certain period of time (50 ms in our simulation), the disk is considered as idle and destaging is started. A Last-Write-First-Destage (LWFD) destage algorithm was developed for the DCD. As shown in FIG. 4, unless a read is performed from the cache-disk, the head of the cache-disk always stays in the Current Log Position (CLP), the track that is ready for next log.

When the idle detector finds the system idle, the LWFD algorithm is invoked by reading back a fixed length of data called destage segment from the cache-disk to a destage buffer. The length of the destage segment is normally several tracks starting from CLP. As shown in FIG. 4, among data logs there may be holes that are caused by data overwriting.

The LWFD will eliminate these holes and pack data when destaging is performed. The data are reordered in the destage buffer and written back to the data disk to their corresponding physical locations. If a read or a write request comes during destaging, the destaging process is suspended until the next idle time is found. After destaging, destage segment on the cache-disk will be marked as blank, the CLP is moved back to a new CLP point, and the next round of destaging starts until all data on the cache-disk are transferred to the data disk and the cache-disk becomes empty.

The LWFD algorithm has two distinct advantages. First of all, after reading the destage segment and writing them to the data disk, the destage segment in the cache-disk is marked as blank and the CLP can be moved back. The disk head is always physically close to the blank track either right on it or several tracks away. When a new write request comes, the disk head can start writing right away or quickly move to the new CLP and start writing. Secondly, in many cases especially for small or medium write bursts, the latest writes are still in the RAM buffer. The LWFD picks up the current destage segment from the buffer rather than from the cache-disk when it starts destaging. The corresponding segment in the cache-disk is marked as blank. In this way, frequency of reading from the cache-disk is reduced for destaging.

DCD With Report After Complete

The previous discussions were based on that the DCD sending an acknowledgement of a write request as soon as the data was transferred into the RAM buffer. This scheme shows excellent performance as shown in our simulation experiment. With only 512 KB to 1 MB RAM buffer and tens of MB cache-disk, the DCD can achieve performance close to that of a solid-stage disk. The reliability of the DCD is also fairly good because data do not stay in the RAM buffer for a long time as discussed previously. If high reliability is essential, the RAM can be implemented using non-volatile memories for some additional cost, or using convention RAM but committing a write request as complete only after it has been actually written into disk similar to a traditional disk. This embodiment is referred to as Report After Complete Scheme. The performance of this configuration would be lower than that of immediate reporting because a request is reported as complete only when all requests in its log are written into a disk.

Crash Recovery

Crash recovery for DCD is relatively simple. Since data are already saved as a reliable copy on the cache-disk, only the mapping information between LBA (Log Block Address) in the cache-disk needs to be reconstructed. One possible way to do this is that for each log writing, an additional summary sector which contains the information about the changes of the mapping table is written as the first block of the current log, similar to the technology used in Log-structured File System. During the crash recovery period, the whole cache-disk is scanned and the mapping table is reconstructed from the summary sectors. The capacity of cache-disk is very small compared to that of data disk, so the recovery can be done very quickly. Another possible way is to keep a compact copy of the mapping table in the NVRAM making crash recovery much easier. The size of NVRAM needed for this information is from tends of kilobyte to hundreds of kilobyte, depending on the size of cache-disk.

Workload Characteristics and Performance Evaluation Methodology

The performance of an I/O system is highly dependent on the workload environment. Therefore, correctly choosing the workload is essential to performance evaluation. There are basically three types of I/O workloads that are common in practice as outlined below.

General office/engineering environment is the most widely used workload environment and is considered by some researchers as the most difficult situation to handle. Rosenblum, M. and Ousterhout, J., The Design and Implementation of a Log-Structured File System, Proceeding of the IEEE, pp. 1842-1858, December 1989. In this environment, disk traffic is dominated by small random file read and write requests. Two important characteristics of this environment are bursty requests and a low average request rate. When there is a request, it is usually accompanied by a cluster of requests in a short time frame. This bursty request pattern is defined as temporal locality of disk requests. It is common to find more than 5 write requests waiting in a queue and the maximum queue length goes up to 100 and even 1000, Ruemmler, C. and Wilkes, J., UNIX Disk Access Patterns, Proceedings of Winter 1993 USENIX, (San Diego, Calif.), pp. 405-420, January 1993. One possible reason for his bursty pattern is the periodical flushing of dirty data from cache by the UNIX operating system. Another possible reason is that in the UNIX system, each file creating/deleting operation causes 5 disk accesses and each file read takes at least 2 disk accesses. Moreover, users tend to read or write a group of files, such as copying, moving, deleting or compiling a group of files. Moving and compiling are especially file system intensive operations because they involve reading, creating, writing and deleting files.

In addition, there is usually a relatively long period of interval time between two consecutive request bursts. Ruemmler and Wilkes, supra, found that in three UNIV file systems (cello for timesharing, snake for file sever and hplajw for workstation), the average disk access rate is as low as 0.076/second (hplajw) to the highest of 5.6/second (cello). That is, over 70% of time the disk stays in idle state. Such low average request rate in the office/engineering environment is very common. For the file system/swap2 which has unusually higher traffic than others, the maximum disk write workload is about 13.3 MB per hour. With this high traffic, there is, on average, a write access rate of only 3.69 or 0.5 times per second if the average write request size is 1K bytes or 89K bytes, respectively. Taking into account the bursty requests phenomenon, there is a very long idle period between two requests bursts.

Another type of important workload is transaction processing which can be found in many database applications such as airline ticket reservation systems and banking systems. The characteristics of this workload are quite different from the office/engineering environment. The average access rate is medium to high and the distribution of disk accesses is fairly uniform over time unlike the office/engineering environment. Throughput is the major concern in this environment. The performance of such systems, however, is largely determined by small write performance, Stodolsky, D.; Holland, M.; Courtright II, W. V.; and Gibson, G. A., Parity Logging Disk Arrays, ACM Transaction of Computer Systems, pp. 206-235, August 1994.

The I/O access pattern in scientific computing or supercomputing environment is dominated by sequential reading or writing of large files. The I/O performance of this kind of workload is mainly determined by the raw performance of I/O hardware such as disk speed and I/O channel bandwidth.

Clearly, different workloads have different disk access patterns. There has been no one optimal I/O system for all different workloads. For example, Log File System performs much better than Fast File System for small file writes in the office/engineering environment. However, Fast File System or Extended File System are still good choices for transaction processing. One could suggest using different file systems for different work loads, but for a system with mixed workloads, keeping multiple file systems in one I/O system is prohibitively expensive.

The DCD system of the invention overcomes this problem because it is implemented at device driver or device level so that only one file system is needed to satisfy diverse workloads. DCD can also change its configuration on-the-fly to adapt to the changing of the workload. One command can make DCD redirect all following requests to bypass the cache-disk and go directly to the data disk, which is equivalent to changing the DCD back to the traditional disk.

The DCD will be described with reference to the most widely used workload environment, the office/engineering workload environment. A real-world workload was used to carry out the simulation. The trace files were obtained from Hewlett-Packard. The trace files contained all disk I/O requests made by 3 different HP-UX systems during a four-month period, Ruemmler, supra.

Three disk systems represent 3 typical configurations of an office/engineering environment. Among them, cello is a time sharing system used by a small group of researchers (about 20) at HP laboratories to do simulation, compilation, editing and mail. The snake is a file server of nine client workstations with 200 users at University of California, Berkeley, and hplajw is a personal workstation.

For each system, 3 days of trace data were randomly selected and the 3 files were concatenated together into one file. We selected the following three days: Apr. 18, 1992, May 19, 1992 and Jun. 17, 1992 for hplajw; Apr. 18, 1992, Apr. 24, 1992 and Apr. 27, 1992 for cello; and Apr. 25, 1992, May 6, 1992 and May 19, 1992 for snake. Because each system contains several disk drives, the most-active disk trace from each system was used as simulation data. The exception was cello, because the most active disk in it contains a news feed that is updated continuously throughout the day resulting in a high amount of traffic similar to a transaction processing workload. The disk containing news partition from the simulation was excluded.

Performance Parameters

The most important I/O performance parameter for an office/engineering environment is the response time. Users in this computing environment are concerned more about response time than about I/O throughput. A system here must provide a fairly short response time to its users. Two response times are used in the performance evaluation. One is the response time faced by each individual I/O request and the other is average response time which is the sum of all individual response times divided by the total number of access requests in a trace.

For the purpose of performance comparison, speeding is also used in their disclosure. The speedup here is defined as the ratio between the average response time in the traditional disk and the average response time of the DCD architecture. It is given by $$speedup = \frac{\text{average response time of traditional disc}}{\text{average response time of DCD disk}}$$

While the DCD architecture may improve I/O performance, it also introduces additional cost to the traditional disk systems. One immediate question is whether such additional cost is justified. In order to take into account the additional cost in the performance evaluation, a new performance parameter was deformed called speedup per dollar or speedup/dollar. The speedup/dollar is defined as the speedup defined above divided by the dollar amount of the extra cost for the DCD system in addition to the cost of traditional disk system. More precisely, it is given by $$speedup/dollar = \frac{speedup}{\text{cost of DCD} - \text{cost of traditional disk}}$$

Trace-Driven Simulator

A trace-driven simulation program was developed for performance evaluation. The program was written in C++ and run on Sun Sparc workstations. The core of the simulation program is a disk simulation engine based of the model of Ruemmler, C. and Wilkes, J., *An Introduction to Disk Drive Modeling*, IEEE Computer, pp. 17–28, March 1994. The disk parameter used in this simulation was chosen based on HP C2200A, Ruemmler supra, as shown in Table 1 below.

TABLE 1

| Formatted Capacity: | 335 MB |
|---|---|
| Track Buffer: | none |
| Cylinders: | 1449 |
| Data Head: | 8 |
| Data Sector per Track: | 113 |
| Sector Size: | 256 B |
| Rotation Speed: | 4002 rpm |
| Controller Overhead (read): | 1.1 ms |
| Controller Overhead (write): | 5.1 ms |
| Average 8 KB access: | 33.6 ms. |

HP C2200A Disk Drive Parameters

The detailed disk features such as seeking time interpolation, head positioning, head switching time and rotation position are included in the simulation model. The data transfer rate between the host and the DCD disk controller is 10 MB/s. For the DCD consisting of 2 physical disks, the program simulates two physical disk drives at the same time, one for cache-disk and the other for data disk. The same disk parameters are used for both cache-disk and data disk except for the capacity difference. For the DCD consisting of only one physical disk, two logic disk drives are simulated by using two disk partitions on a signal physical drive. Each of the partitions corresponds to a partition of one physical HP C2200A disk.

One difficult task is designing the DCD disk system is to keep the mapping information of the Physical Block Address (PBA) in the data disk and the Log Block Address (LBA) in the cache-disk and to make the information retrieval efficient. In our simulation program, several data structures were created for this including a PBA hash chain, a LBA table and a buffer list for LRU/Free buffer management. Some structures are borrowed from the buffer management part of UNIX, Leffler, S. J.; McKusick, M. K.; Karles, J. J.; and Quarterman, J. S., *The Design and Implementation of the 4.3BSD UNIX Operating System*, Reading, Mass., USA: Addison-Wesley, 1989.

Numerical Results and Performance Evaluations

The performance of the DCD system described in the previous section was evaluated by means of the trace-driven simulation. The simulation program has been run under various configurations using the trace data described above. The RAM buffer size is assumed to be 512 KB and cache-disk is assumed to be 20 MB in the simulation. Both physical cache-disk DCD and logical cache-disk DCD systems were simulated. For the DCD consisting of two logical disks, the first 80,000 sectors (20 MB) in a disk drive was assigned as logical cache-disk and the rest partitioned as a logical data disk to run the simulation. All results are obtained with the destage process running unless otherwise specified.

Write Performance with Immediate Report

Figure 5A:
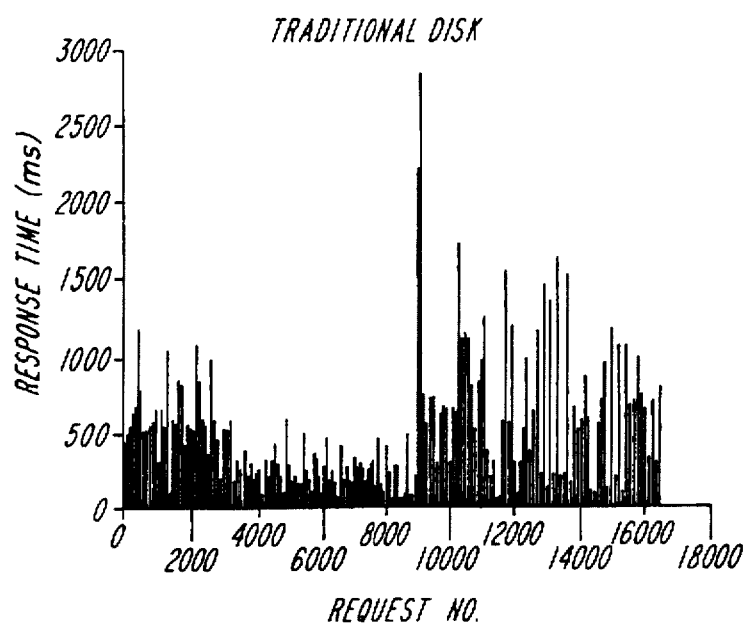
FIGS. 5a and 5b are graphs of write response time comparison between a traditional disk and a disk of the invention with an intermediate report for the trace hplajw.
Figure 5B:
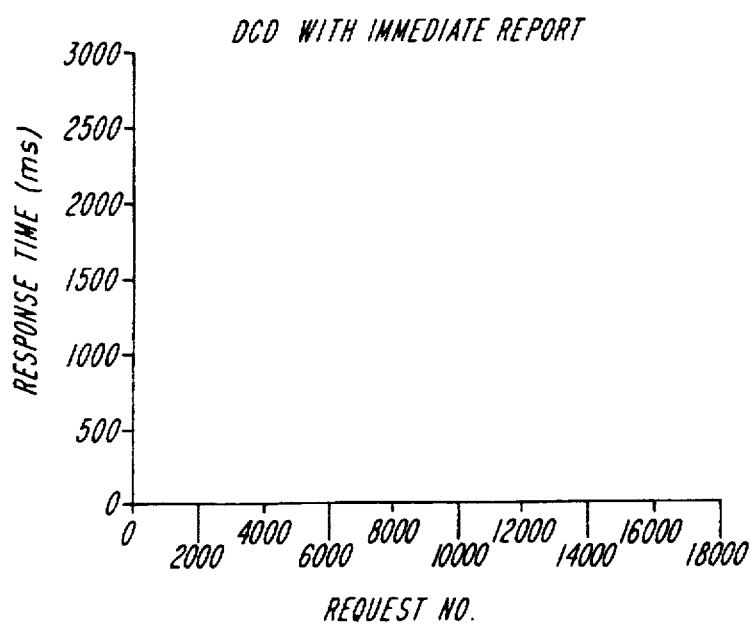
Figure 6A:
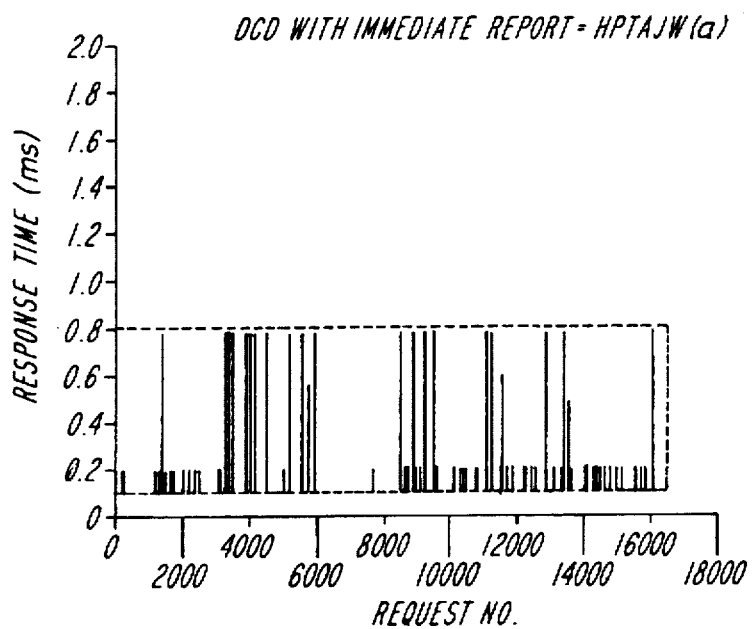
FIGS. 6a and 6b are write response times of hplajw and snake with smaller scale.
Figure 6B:
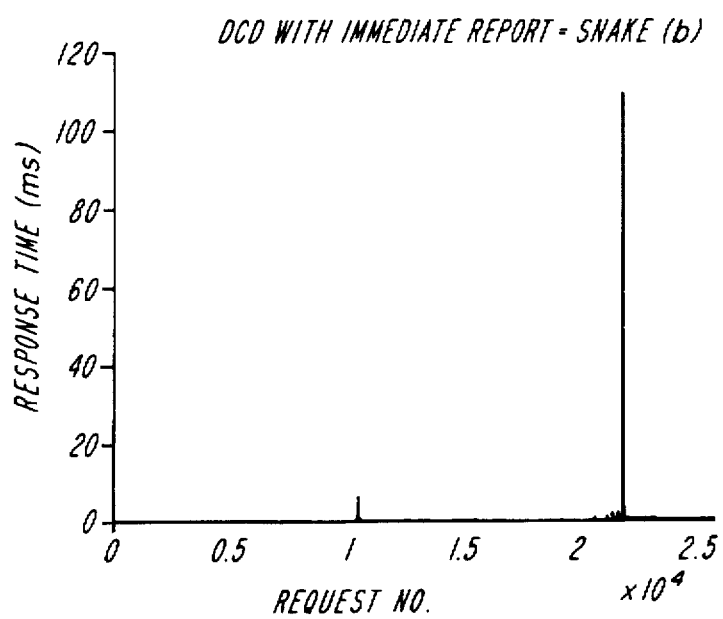
Figure 7A:
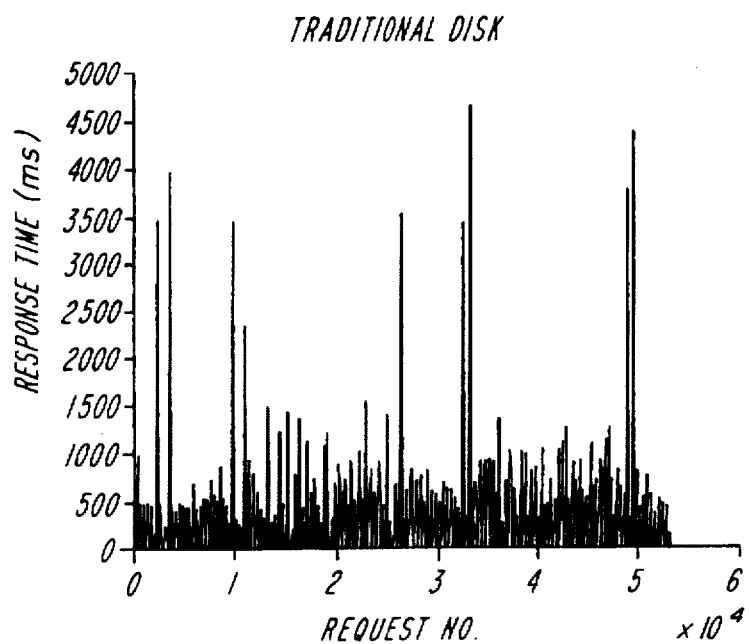
FIGS. 7a and 7b are a write response time comparison between a traditional disk and a disk of the invention with an intermediate report for the trace cello.
Figure 7B:
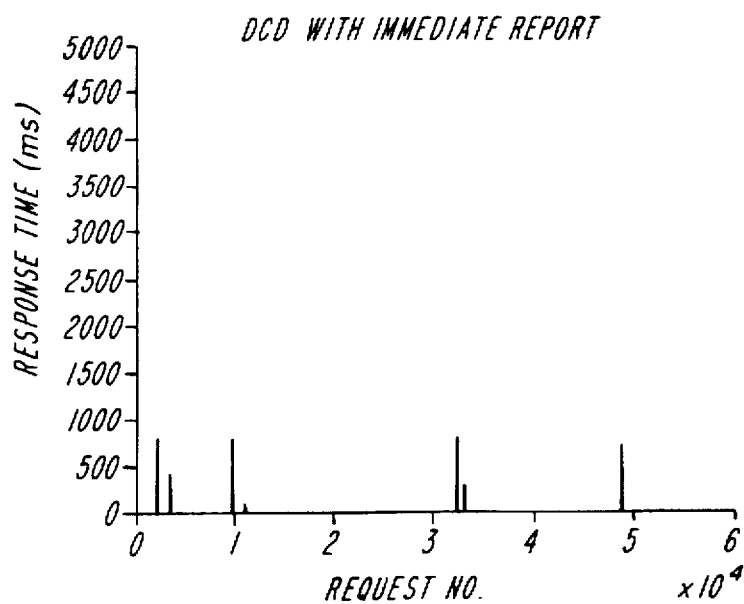
Figure 8A:
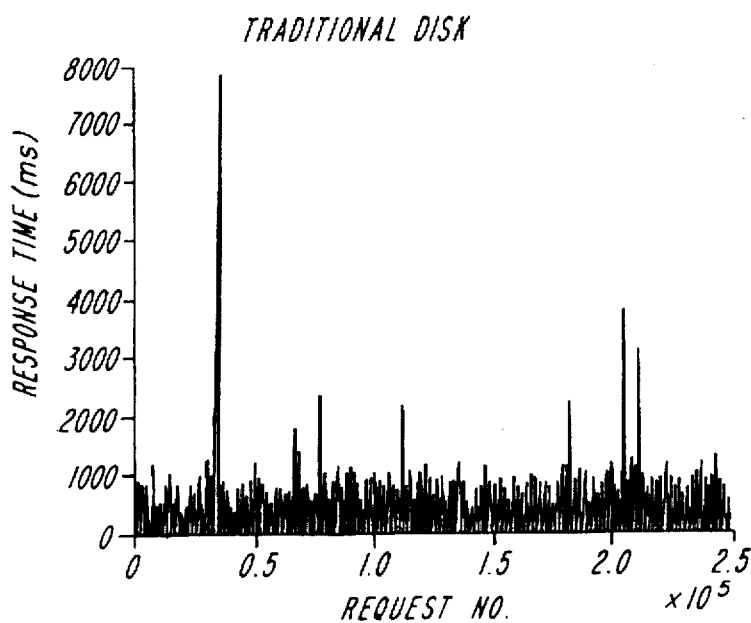
FIGS. 8a and 8b are graphs of the write response time comparison between a traditional disk and a disk of the invention with an intermediate report for the trace snake.
Figure 8B:
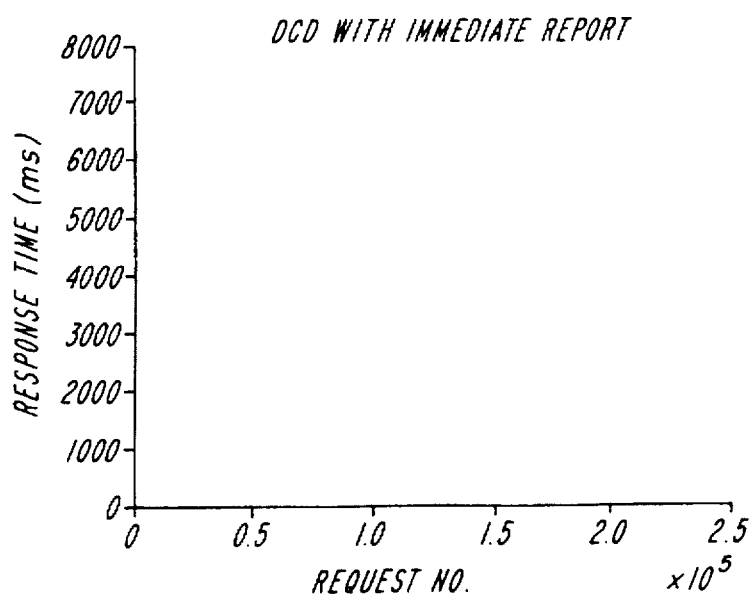

For the purposes of comparison, we simulated write performance of both a traditional single-disk system and the DCD system with two logical disks was simulated. The cache-disk is therefore a 20 MB partition of the data disk. FIG. 5 shows the response time of every write request in the hplajw traces for a traditional disk system and the DCD system, respectively. The large peaks in the curves confirm the bursty pattern of I/O requests. Each peak in the figure indicates a long response time faced by a disk request. The height of each peak represents the maximum response time experienced by an I/O request and the number of peaks represents the number of I/O requests being delayed. It can be seen from FIG. 5 that the peaks that are present in the curve for traditional disk completely disappeared from the response time curve of DCD system. The response times of DCD are too small to show in this figure with such large scales. Response times of DCD were plotted again with smaller scales in FIG. 6a. It is interesting to note in this figure that there is no queuing at all with the DCD system for this trace data. Write response times are all between 0.1 ad 0.8 ms because the size of majority requests is 8 KB which is also the maximum size in the trace. Response times for cello traces are shown in FIG. 7. The number of peaks here are dramatically reduced and so are the magnitude of the peaks in the DCD system as compared to the traditional disk system. Fewer peaks in the curve for the DCD system indicates a lesser number of write requests that experience long response time. The dramatic height reduction of the peaks implies that the maximum delay among the requests is much smaller. Similar performance results are observed for the other trace, snake, as shown in FIG. 8. They are plotted again with the smaller scales shown in FIG. 6b. It can be seen from this figure that most requests have a very small response time, mainly data transfer time, except for one peak that approaches 110 ms.

As shown in FIGS. 5, 7 and 8, the individual write response times of the DCD for the same trace are significantly lower than the traditional disks. The few peaks in the curves for the DCD system correspond to the situation where the RAM buffer becomes full before the cache-disk finishes writing of the current log and incoming requests must wait in queue. For this set of curves, the RAM buffer size was limited to 512K bytes in the simulation. As expected, most write requests in the DCD system do not need to wait in queue and only experience data transfer time or the data copy time by CPU if the DCD is implemented at device driver level.

Table 2 below lists average and maximum response times for the three traces. As shown in the table, the average write response time of the traditional disk system is as high as 205 ms. The maximum write response time shown here is 7899 ms implying a very long waiting queue at the controller. However, the average write response times of the DCD system for hplajw and snake are less than 1 ms which is more than two orders of magnitude improvement over the traditional disk. The relatively long response time for cello, 5.9 ms which represents about one order of magnitude improvement over the traditional disk, is mainly due to several large peaks because of the limited amount of buffer. Other than a few peaks, the performance improvements are similar to those of hplajw and snake. The performance will be even better when the transfer rate of I/O bus gets improved. For example, the I/O transfer rate was 10 MB/s in the simulation, while the maximum transfer rate of the fast-wide SCSI-2 bus is 40 MB/s today.

TABLE 2

|  | Traditional Disk | | Logical DCD disk | |
|---|---|---|---|---|
| Traces | avg rsp time | max resp time | avg resp time | max resp time |
| hplajw | 134 | 2848 | 0.65 | 0.8 |
| cello | 205.3 | 4686 | 5.9 | 808.65 |
| snake | 127.6 | 7899 | 0.75 | 109.4 |

Write response time comparison between traditional disk and DCD disk with immediate report (ms)

DCD with Report After Complete

Figure 9A:
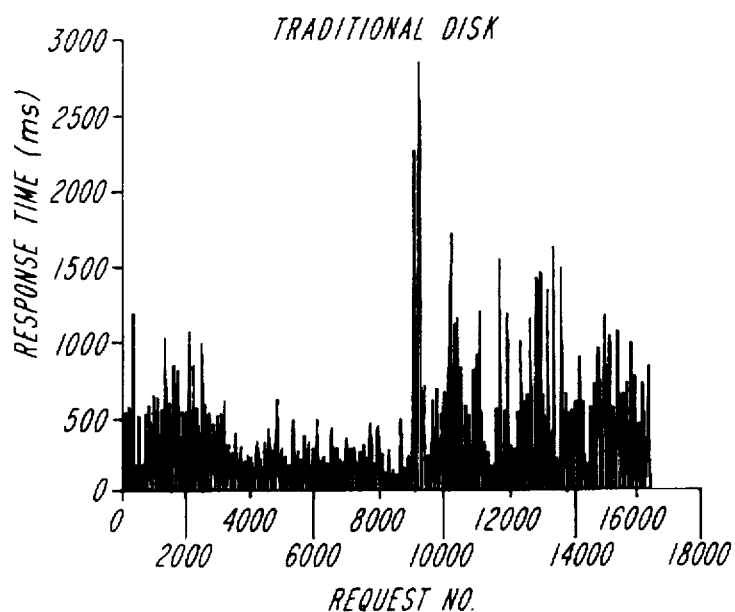
FIGS. 9a and 9b are graphs of the write response time comparison between a traditional disk and a disk of the invention with a report after complete disk for the trace hplajw.
Figure 9B:
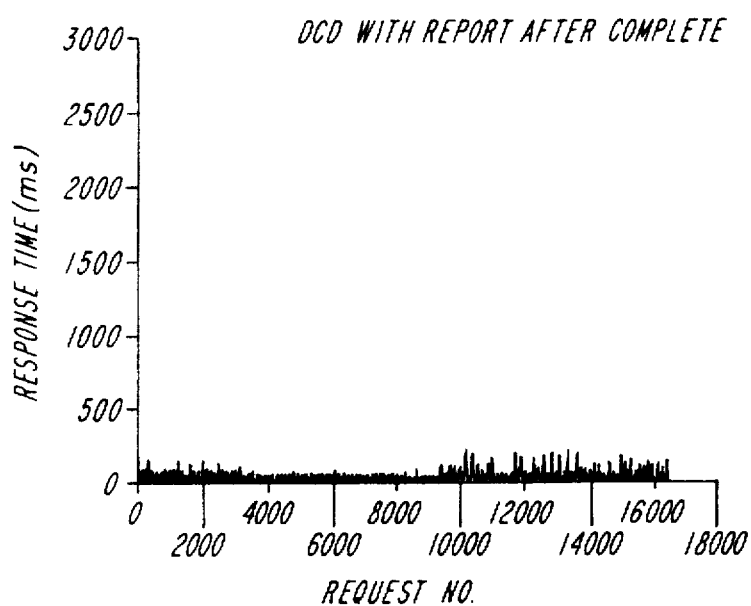
Figure 10A:
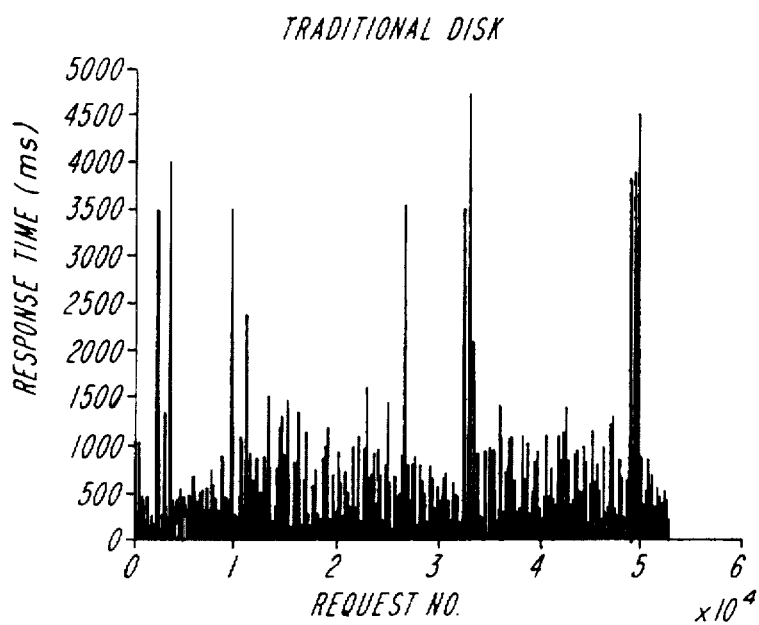
FIGS. 10a and 10b are graphs of a write response time comparison between a traditional disk and a disk of the invention with a report after the complete disk for the trace cello.
Figure 10B:
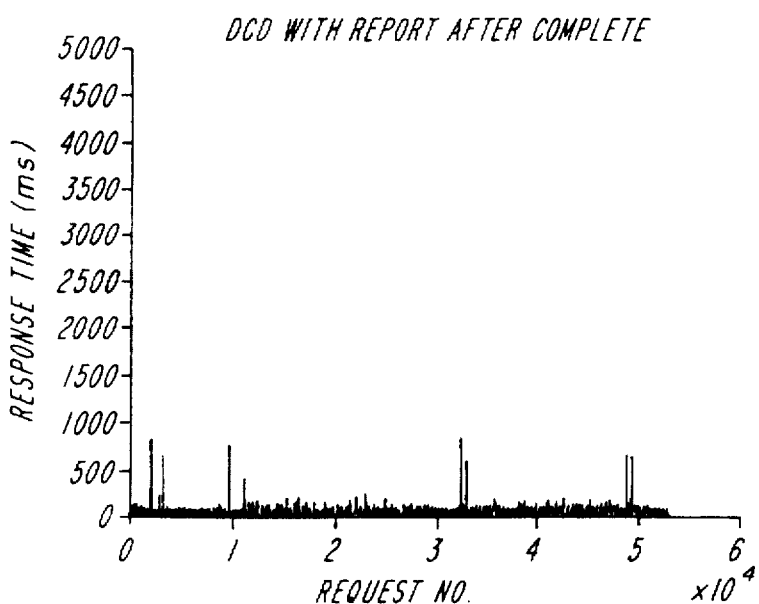
Figure 11A:
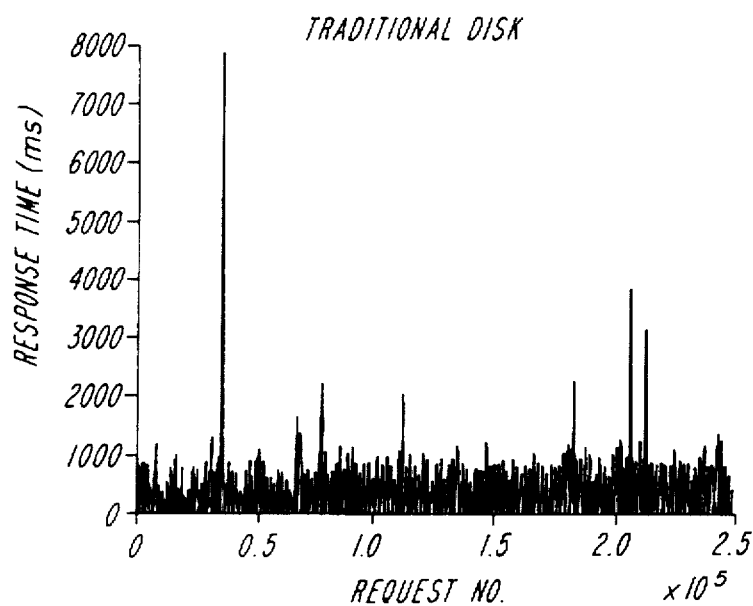
FIGS. 11a and 11b are comparison graphs of the write response time comparison between a traditional disk and a disk of the invention with a report after complete disk for the trace snake.
Figure 11B:
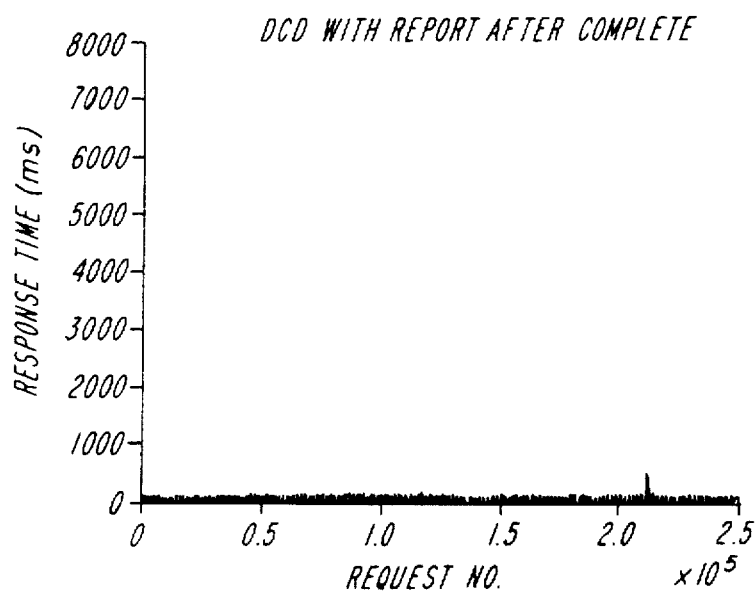

The DCD has good reliability because a write is guaranteed to be stored in the disk before the controller can proceed. If the RAM buffer were volatile memory, this scheme would be much more reliable than the Immediate Report Scheme. But the performance of the former is lower than the latter because a request is acknowledged as complete when all requests in its group are written into disk. Nevertheless, the DCD still shows superb performance. FIGS. 9, 10 and 11 illustrate the performance of the DCD disk system with Report After Complete scheme as compared to the traditional disk. In these figures, a separate physical disk was used as the cache-disk. The number of peaks and the height of each peak of the DCD system are significantly lower than the traditional disk system as shown in the figures.

Table 3 below shows the average and maximum write response times for the two architectures. The DCD system show about 2 to 4 times better performance than that of the traditional disk. Note that in the simulation the old HP 2200A disk model is used that has slow spindle speed and low recording density. It is expected that the speedup factor will increase greatly when the disk spindle speed and linear density improves. This expectation comes from the fact that the performance improvement of the DCD results mainly from the reduction of seek time and rotation latency, while the disk write time remains the same as a traditional disk. Therefore, the DCD will show even better performance if the proportion of seek time in each disk access increases. It is fairly clear that the average seek time is not likely to be reduced very much in the near future, but the rotation speed is expected to increase to 7200 rpm. Some disk drives have already used the speed of 7200 rpm. The linear density is expected to double in the next few years. As a result, write time will be reduced to one-third of its present value. Therefore, we expect the speedup factor of the DCD will be greater in the near future.

TABLE 3

|  | Traditional Disk | | Physical DCD | | Logical DCD | |
|---|---|---|---|---|---|---|
| Traces | average | max | average | max | average | max |
| hplajw | 134 | 2848 | 40.3 | 211 | 53.1 | 266.4 |
| cello | 205 | 4686 | 56.5 | 849 | 74 | 5665.9 |
| snake | 127.6 | 7898 | 29.4 | 491 | 59.4 | 4613.4 |

Write response time comparison between traditional disk and DCD disk with report after complete (ms)

Destage Cost

The performance results presented in the previous subsections were obtained when the destage algorithm was running. In order to study the performance effects of the destage process, the destaged process was deliberately disabled and the simulation was run again for shorter traces until the cache-disk was full. The results are shown in Tables 4 and 5 below. Only the response time was measured for the Report After Complete scheme because the performance of DCD with immediate report is not very sensitive to the destage process. Destaging has almost no affect on the performance of the physical DCD for hplajw and snake indicating that the LWFD destage algorithm performs very well, but it does affect the performance of logical DCD system because the data disk is utilized more. Performance degradation caused by destaging ranges from 16% for snake to 39 for hplajw. It also has a dramatic effect on cello (up to 254%) because of the high request rate and relative uniform pattern in cello. It is not easy to find a long idle time of the data disk to perform destaging by our simple idle detector. Note that all the simulation results except for this subsection are obtained with the destage algorithm running. It is expected that more performance gains in the DCD system can be obtained by using a good idle detector, and by applying a disk-arm-scheduling algorithm to the destage process, Jacobson, D. M. and Wilkes, J., *Disk Scheduling Algorithms Based on Rotational Position*, Tech. rep. HPL-CSP-91-7revl., Hewlett-Packard Laboratories, March 1991; and Seltzer, M.; Chen, P; and Ousterhout, J., *Disk Scheduling Revisited*, Proceedings of the 1990 Winter USENIX, (Washington, D.C.), pp. 313–324, Jan. 22–26, 1990.

TABLE 4

| Traces | DCD with 2 physical disks | | DCD with 2 logical disks | |
| --- | --- | --- | --- | --- |
|  | (Destage On) | (Destage Off) | (Destage On) | (Destage Off) |
| hplajw | 28.5 | 28.9 | 39.6 | 28.5 |
| cello | 77 | 43 | 112 | 44 |
| snake | 32 | 32.2 | 66.7 | 57.5 |

Effects of destaging algorithm, average write response time (ms)

TABLE 5

| Traces | DCD with 2 physical disks | | DCD with 2 logical disks | |
| --- | --- | --- | --- | --- |
|  | (Destage On) | (Destage Off) | (Destage On) | (Destage Off) |
| hplajw | 77.8 | 83 | 149 | 77 |
| cello | 850 | 480 | 1281 | 772 |
| snake | 145 | 147 | 2485 | 2400 |

Effects of destaging algorithm, maximum write response time (ms)

Logical Disk Cache vs Physical Disk Cache

The DCD system can be implemented either using two physical disk drives, or using two logical drives. DCD with two physical drives has good performance but the cost is relatively high because it requires an additional disk drive though with small capacity. While the DCD configured using two logical disk drives may not perform as good as two physical disks, its cost is just a small disk space (5–50 MB) which is a very small fraction of the total capacity of today's disk drive that is usually more than 1 GB. In order to compare the performance difference between physical cache-disk and logical cache-disk, the results for both cases are listed in Tables 3 to 5. As expected, the performance of the DCD with logical cache-disk performs very well. For immediate report, the average write response times are two orders of magnitude faster than those of traditional disk as shown in Table 2. The performance of the DCD with Report After Complete is lower than the DCD with two physical drives as shown in Table 3. However, the performance of the logical cache-disk DCD is several times better than that of a traditional disk as shown in the tables. It is expected that the speed up factor will get larger with the increase of disk spindle speed and linear density.

Read Performance

The read performances of the DCD and the traditional disk are compared in Tables 6 and 7 below. For hplajw, the average read performance of the DCD is about two times better than the traditional disk while the maximum response time of the DCD is 10 times smaller than that of traditional disk. For snake, the DCD shows about 50% better average response time and about 9 times better maximum response time than the traditional disk. It is important to note that the above improvements are true for both the two physical disk DCD and the two logical disk DCD systems. The performance improvements for read requests can mainly be attributed to the reduction of write traffic at the data disk. The data disk has more available disk time for processing read requests. For cello, the DCD shows similar performance to the traditional disk due to high read traffic and the limitation of buffer size as indicated before.

TABLE 6

| Traces | Tradition Disk | DCD with 2 disks | DCD with 2 logical disks |
| --- | --- | --- | --- |
| hplajw | 53.5 | 21.1 | 22.1 |
| cello | 159.3 | 149.6 | 150.4 |
| snake | 189 | 103 | 106 |

Average read response time (ms)

TABLE 7

| Traces | Tradition Disk | DCD with 2 disks | DCD with 2 logical disks |
| --- | --- | --- | --- |
| hplajw | 2873 | 156.5 | 156.5 |
| cello | 3890 | 3890 | 3890 |
| snake | 7276 | 769 | 810 |

Maximum read response time (ms)

Performance vs Cost

The DCD introduces additional cost to the disk system. Based on the current cost figure of disk and RAMs, (the cost of 1 MB storage is about $0.25 for disk and $120 for non-volatile RAM). In this subsection is presented the speedup and the speedup per dollar of the DCD system. The RAM buffer is implemented using non-volatile RAM which is more expensive than volatile RAM. Immediate reporting is used with a logical cache-disk of 20 MB in the DCD.

Figure 12A:
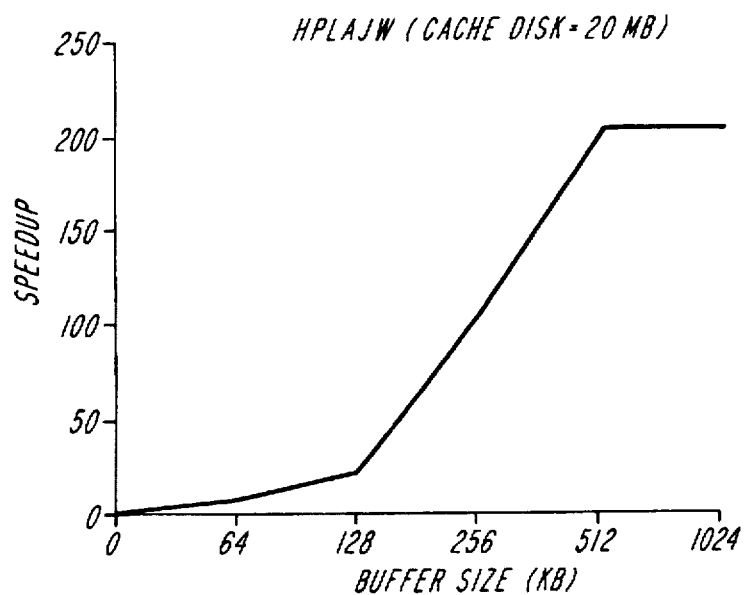
FIGS. 12a and 12b are graphs of the setup and speedup/ dollar of the disk of the invention for the trace hplajw.
Figure 12B:
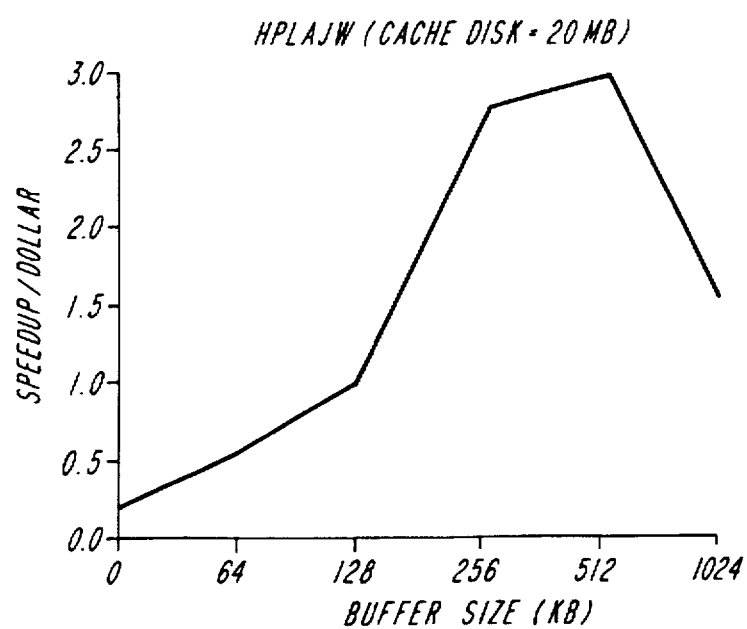
Figure 13A:
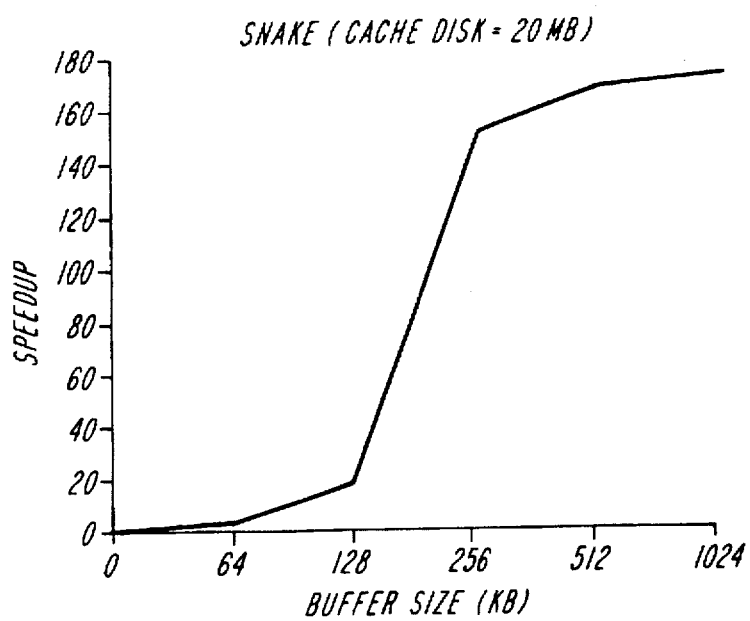
FIGS. 13a and 13b are graphs of the speedup and speedup/dollar of the disk for the trace snake.
Figure 13B:
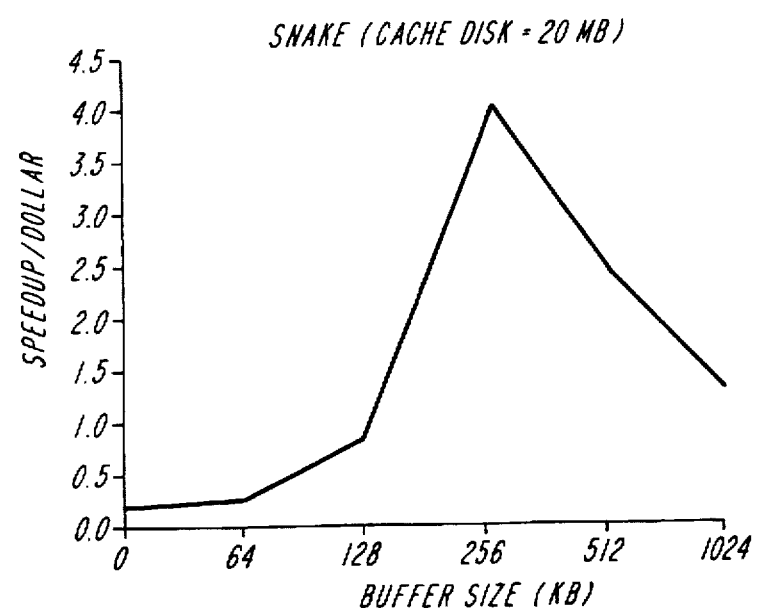
Figure 14A:
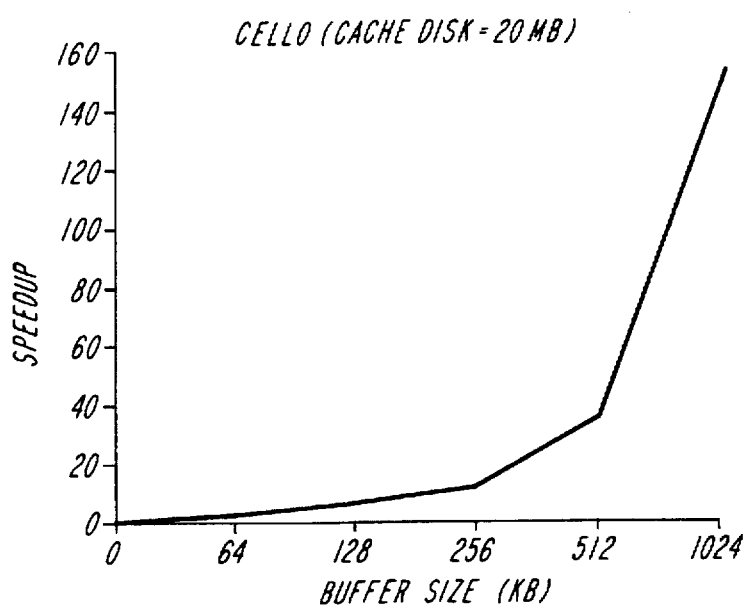
FIGS. 14a and 14b are graphs of the speedup and speedup/dollar of the disk for the trace cello.
Figure 14B:
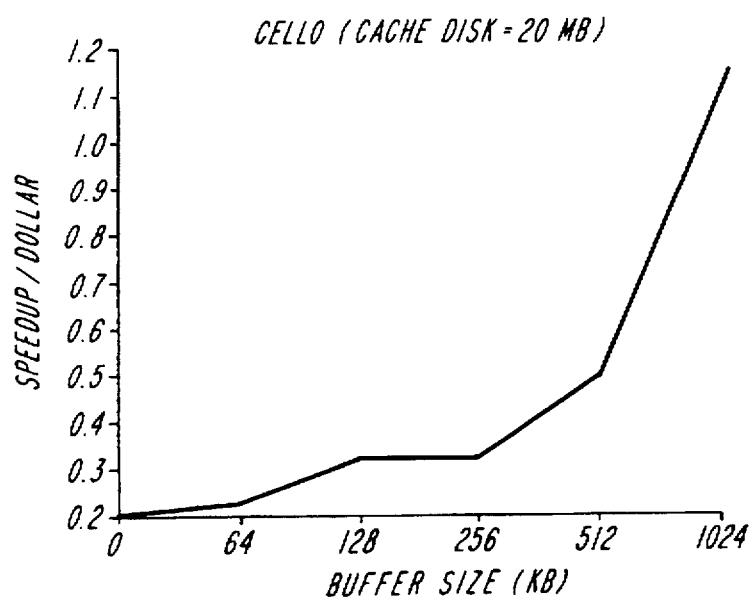

FIG. 12 shows the speedup and speedup per dollar of hplajw. As the non-volatile RAM size increases, the speedup increases up to over 200 then flats out after the RAM size exceeds 512 KB. The figure next to the speedup curve is the speedup one can obtain for each dollar spent. At the peak point with RAM size being 512 KB, one obtains speedup factor of 3 for each dollar spent. Similar results are observed for snake traces as shown in FIG. 13 except that when the RAM size is 256 KB the best performance/cost ratio results. FIG. 14 shows the similar curves for cello which has much more disk traffic. The speedup increases monotonically with the increase of RAM size. With 1 MB RAM, the speedup is about 160 and performance/cost ratio is about 1.15 meaning that one can obtain more than X times better write performance than the traditional disk for the cost of X dollars. The DCD is very cost-effective.

It is believed the DCD architecture can be successfully applied to the RAID architecture to optimize both throughput and response time of the future RAID systems.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention what we now claim is:

1. A method for enhancing the performance of a disk architecture system which comprises:

reading the size of a write request;

transferring the write request as data to a data disk if the write request is greater than a predetermined length;

transferring the write request as data to a buffer if it is less than said predetermined length;

transferring the data from the buffer to a cache disk when the cache disk is idle and storing the transferred data in log format; and destaging the data from the cache disk to the data disk during the idle time of the disk system wherein destaging comprises:

transferring a destage segment from the cache disk to a destage buffer;

marking said destage segment from the cache disk as a blank segment;

reordering the data in said destage buffer; and transferring the head of the cache-disk to the beginning of said blank segment.

2. The method of claim 1 which comprises:

detecting when the disk system is idle.

3. The method of claim 1 which comprises:

suspending the transfer of data from the cache disk to the data disk when a read or write request is received.

4. The method of claim 1 wherein the buffer has a memory of between about 100 KB to 1 MB.

5. The method of claim 1 wherein the cache disk has a size of between about 1 MB to 50 MB.

6. The method of claim 1 which comprises:

forming a data log in the buffer.

7. The method of claim 1 which comprises:

forming a log of data in the buffer and transferring subsequently the log of data to the cache disk.

8. A system for enhancing the performance of a disk architecture which system comprises:

a controller;

a buffer in communication with the controller adapted to accept write requests of less than a predetermined size;

a data disk in communication with the controller and adapted to accept write requests of greater than a predetermined size;

a cache disk interposed between the buffer and the data disk and in communication with the buffer and the data disk and the controller, the cache disk adapted to store the data from the buffer in log format and to transfer the data to the data disk during the idle time of the disk system; and said controller further adapted for transferring a destage segment from the cache disk to a destage buffer, marking said destage segment from the cache disk as a blank segment, reordering the data in said destage buffer; and transferring the head of the cache-disk to the beginning of said blank segment.

* * * * *